United States Patent

[11] 3,595,257

| [72] | Inventor | Richard L. McMahon<br>Burbank, Calif. |
|---|---|---|
| [21] | Appl. No. | 843,499 |
| [22] | Filed | July 22, 1969 |
| [45] | Patented | July 27, 1971 |
| [73] | Assignee | Schlumberger Technology Corporation<br>New York, N.Y. |

[54] VACUUM FILLING PROCESS AND SYSTEM FOR LIQUID-FILLED MARINE SEISMIC CABLES
3 Claims, 6 Drawing Figs.

[52] U.S. Cl. .................................................... 137/1,
137/205, 141/59, 174/25
[51] Int. Cl. ............................................. H01b 7/02
[50] Field of Search ........................................... 174/25;
137/205; 141/59; 137/1, 15

[56] References Cited
UNITED STATES PATENTS

| 2,024,144 | 12/1935 | Chase | 174/25 UX |
| 3,409,488 | 11/1968 | Etsuji | 174/25 X |
| 3,514,349 | 5/1970 | Masamoto | 174/25 X |

Primary Examiner—Alan Cohan
Attorneys—Ernest R. Archambeau, Jr., William J. Beard, Stewart F. Moore, David L. Moseley, Edward M. Roney and William R. Sherman ABSTRACT: A technique for completely filling a multicompartmented marine seismic cable with a compatible filling liquid such as kerosene, wherein the air in a hollow cable on a spool is evacuated with a vacuum pump from one end of the cable while the liquid is pumped into the cable through the opposite end until it is full. Improved evacuation and filling means are also provided which prevent loss of vacuum during the filling process.

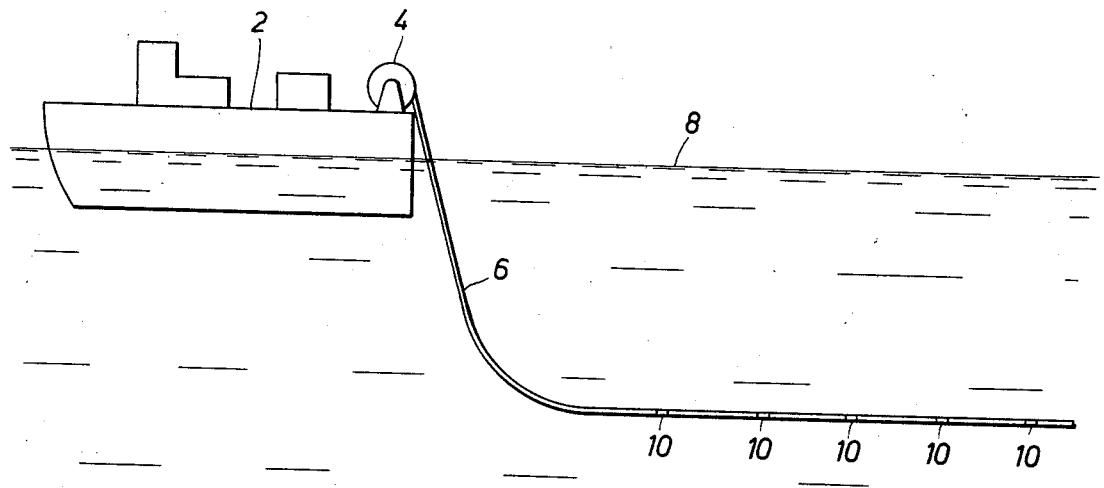
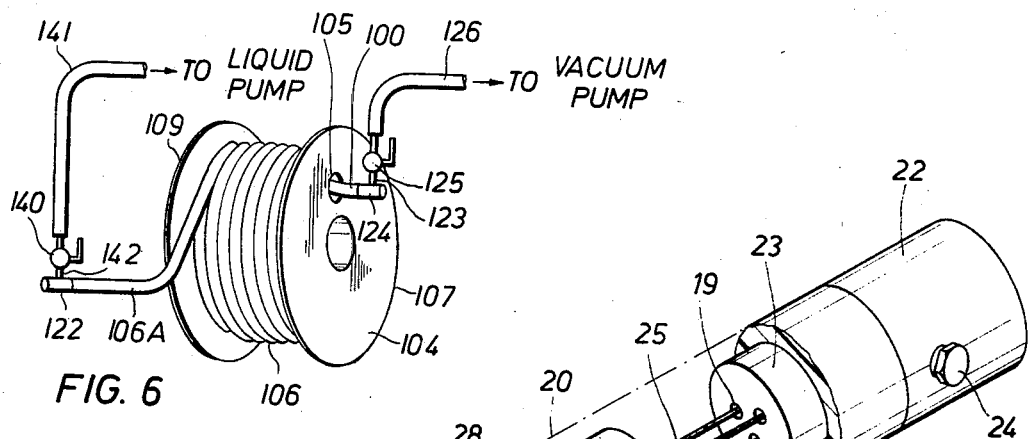
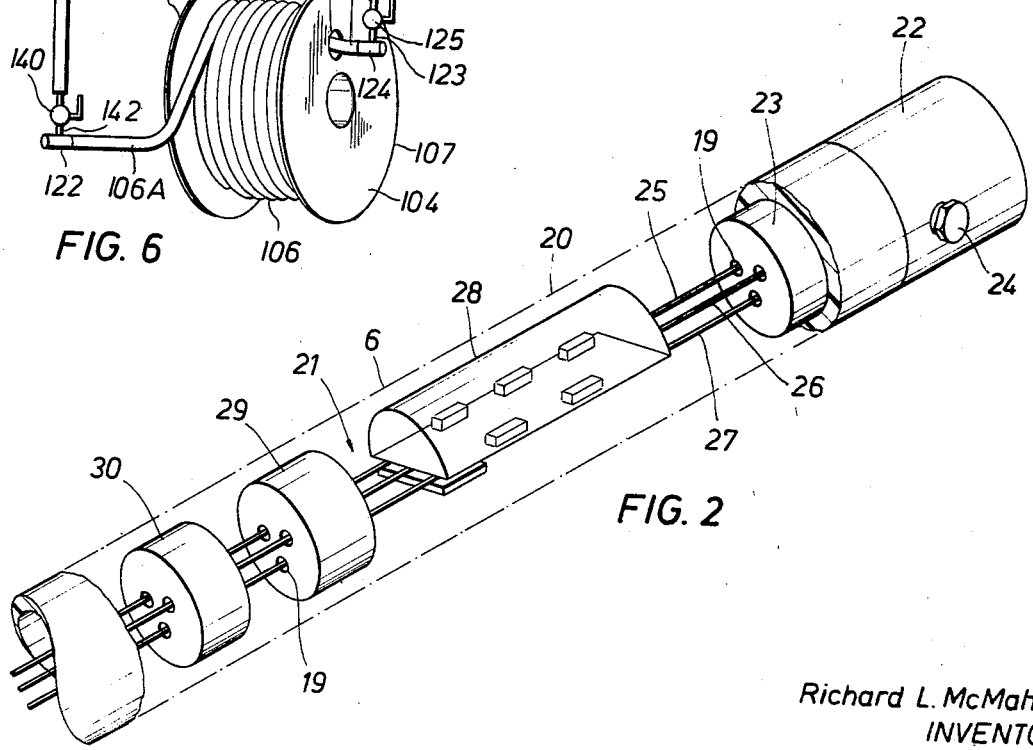
PATENTED JUL 27 1971
3,595,257
SHEET 1 OF 2
FIG. 1
FIG. 6
FIG. 2
Richard L. McMahon
INVENTOR
BY Arnold, Roylance,
Kruger & Durkee
ATTORNEYS Richard L. McMahon
INVENTOR BY Arnold, Roylance,
Kruger & Durkee

VACUUM FILLING PROCESS AND SYSTEM FOR LIQUID-FILLED MARINE SEISMIC CABLES

BACKGROUND OF INVENTION

This invention relates to methods and apparatus for completely filling a contorted hoselike body with a liquid, and more particularly, relates to improved methods and apparatus for filling marine seismic cable with kerosene or the like while the cable is wound on a spool.

It is well known to recover oil and gas through boreholes which are drilled into subsurface earth formations, and it is further well known that such formations may be located below the floor of the ocean. In prospecting for offshore oil and gas bearing formations, it is conventional to trail a hollow marine seismic cable behind the stern of a ship or other vessel for the purpose of investigating the subsurface character of the submerged earth. As may be seen in U.S. Pat. No. 3,439,319, it is desirable for such purposes that the cable be positioned along substantially its entire length at a preselected uniform depth. It is necessary that the cable be substantially entirely filled with a liquid such as kerosene or the like to render the cable neutrally buoyant in the water. Paravanes and weights and the like may be used to position the cable at a preselected depth in the water during its use.

It will be readily apparent that a typical marine seismic cable is awkward and inconvenient to handle and store because of its bulk and length. Thus, it is conventional to roll the cable on a large spool during and after fabrication, and the cable is usually kept wound on the spool at all times except when it is being used or repaired.

As may be seen in U.S. Pat. No. 3,439,319, however, the cable is composed of a tubular sheath loaded with electrical leads, geophones, cable supports and the like, which are spaced apart so as to establish a plurality of compartments within its interior and along its length. Although there is communication between these compartments throughout the length of the cable, such communication is only by way of relatively narrow openings for admitting the conductors. Hence, it will be readily apparent that it is extremely difficult to flow the liquid between the various internal spaces and compartments so as to fill the entire length of the cable with liquid without trapping air in one or more of these compartments.

These air pockets in the cable constitute locations of inherent weakness when the cable is submerged. Further, it is much more difficult to maintain the cable at a preselected depth in the water when the cable contains pockets of entrapped air. Accordingly, it is sought to completely fill the cable with liquid before it can be satisfactorily used for its intended purpose, notwithstanding the obvious difficulty of connecting liquid from one end of the cable, to the other end, without trapping any substantial amount of air at any point along its length. Furthermore, the task of filling the cable is even more difficult when the cable is wound about the spool.

Accordingly, the usual practice is to first unwind the cable from the spool, and to stretch it out flat before attempting to fill it with the buoyant liquid. Thereafter, the kerosene or other liquid is poured or injected into one end of the cable while it is held at an elevation above the other end which is kept open to permit the air to escape. During the pouring step, however, the cable is manipulated, twisted, and vigorously pounded with cudgels, or the like, in order to drive out any air entrapped in any of the compartments along the length of the cable. After the cable has been completely filled with liquid in this manner, both ends are usually stoppered to prevent spillage or leakage of the liquid.

Although the foregoing technique is the most common process for filling a cable of this type, it is obviously unsatisfactory for several reasons. In the first place, pounding the cable with cudgels or the like often damages one or more of the geophones in the cable. Second, it usually requires strenuous effort by several workmen for three to four hours to fill a cable of merely average length. Third, it is often inconvenient to the operation and safety of the ship, to unwind the cable from the spool and stretch it out on the deck, and finally, any spillage or leakage of kerosene is a clear risk of fire, which is particularly undesirable on board a ship.

SUMMARY OF INVENTION

These and other disadvantages of the prior art are overcome with the present invention, and improved methods and apparatus are provided herein for conveniently filling a conventional marine seismic cable with a liquid without appreciable spillage, in a relatively short time, and without the necessity for removing the cable from its spool.

In the broadest form of the preferred embodiment of the present invention, one end of the multicompartmented cable is disposed through a hole or other aperture in one of the flanges of the spool, and is stoppered by means of a special end plug having a fitting and valve. The other end of the cable is similarly provided with a special end plug and valve of like design. The fitting and valve on one of the plugs is preferably connected to a suitable vacuum pump by a flexible conduit or hose, and the fitting and valve on the other plug is likewise connected to a pressured supply of buoyant liquid by another similar hose or conduit.

Both valves are initially closed to isolate the interior of the cable from ambient atmospheric pressure. Thereafter, the valve is opened which is adjacent or connected to the vacuum pump, and the vacuum pump is then actuated to begin evacuating air from the interior of the cable.

Coincident or immediately following actuation of the vacuum pump, the other valve may be opened and liquid may be pumped into the opposite end of the cable to replace the air being evacuated from the other end. The process is then continued, until the air in the cable is completely replaced by liquid, whereupon both valves may be closed to seal the liquid in the cable. The pumps may then be deenergized, and both hoses removed or disconnected from the two end plugs.

It will be apparent that, with the foregoing technique, substantially all of the air in the cable will be drawn out and will be replaced therein by the kerosene. Thus, the cable may be filled while wound on the spool or in any other contorted configuration (except kinked), and the necessity for pounding the exterior of the cable merely to dislodge air bubbles in the various compartments is completely eliminated. Furthermore, the cable may now be transmitted to and loaded aboard ship while empty, and need not be filled and sealed before leaving the manufacturer. A cable of average length (such as 300—350 feet) may be easily evacuated and filled with liquid by this process in approximately 10 minutes or less, whereas with the practice of the prior art, such a cable could not ordinarily be properly filled with liquid within less than 3 hours. Additionally, much labor time is saved in not having to unwind and wind the cable on the spool, and the likelihood of damaging the cable components due to handling is eliminated.

Any suitable pumping equipment may be used for the purpose of the present invention, both for evacuating air from the interior of the cable and for replacing such air with liquid. It is extremely desirable, however, to position the end through which liquid is fed into the cable at a higher elevation than that of the end through which air is evacuated. Accordingly, it is desirable to evacuate air from the cable end which is thrust through the aforementioned aperture in the flange of the spool, and to insert liquid in through the other "dangling" end of the cable. Another reason for this particular arrangement of the pumps, is that the inner windings of cable on or adjacent the axle of the spool tend to be compressed by the weight of the cable itself. Although this does not greatly affect the flow rate of fluid flow between the compartments within the cable, it does tend to reduce the compartment volume. Accordingly, this pump arrangement tends to provide the advantages of pulling (as well as pumping) the liquid into and through the portion of the cable which it is most difficult to fill.

These and other features and advantages of the prior art will be apparent from the following detailed description, wherein reference is made to the figures in the accompanying drawings.

DRAWINGS

FIG. 1 is a simplified pictorial representation of a floating vessel trailing a typical marine seismic cable or the like in a conventional manner for purposes of investigating the subsurface character of the submerged earth.

FIG. 2 is a pictorial representation exposing the internal configuration of a cable of the type depicted in FIG. 1.

FIG. 6 is a pictorial representation of a marine seismic cable wound on a spool or the like in a manner suitable for the purposes of the present invention and provided with end fittings of the type depicted in FIG. 3, whereby the cable may be filled while mounted on the spool.

DETAILED DESCRIPTION

Figure 3:
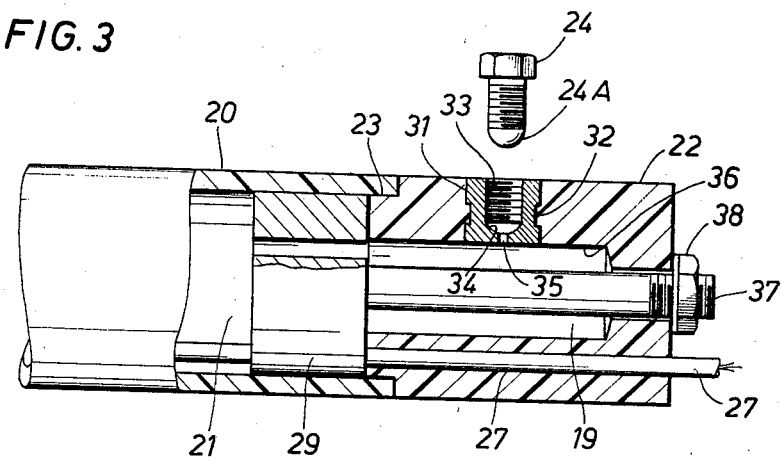
FIG. 3 is a pictorial representation, partly in cross section, of a device suitable for providing means for evacuating air from within a marine seismic cable or the like, and for replacing the evacuated air with a liquid such as kerosene.

Referring first to FIG. 1, there may be seen a simplified pictorial representation of a vessel 2 towing a marine seismic cable 6 behind it in a conventional manner. As illustrated, a winch or spool 4 may be mounted on the fantail or other stern portion of the vessel 2, whereby the cable 6 may be paid out behind the vessel 2 as it travels forward. As further illustrated, suitable means such as paravanes (not depicted), depth controllers, or the like may be used to maintain the greater portion of the cable 6 at a uniform depth below the surface 8 of the water whereby the geophones 10 may be located at the same depth in the water.

Referring now to FIG. 2, there may be seen a pictorial representation of a portion of a typical marine seismic cable 6 such as that depicted in FIG. 1, and showing how the interior of the cable 6 is divided into a plurality of compartments having only limited communication therebetween. In particular, the cable may be seen to include a flexible tubular sheath 20 usually formed of clear vinyl or the like and containing a plurality of spaced-apart annular supporting rings hereinafter referred to as anchors 29 (only one depicted) for providing internal support for the various electrical leads 25—27 which extend from component to component, throughout the length of the cable 6. A geophone 30, which may be any suitable device such as a piezoelectric transducer, may be mounted in the sheath 20 at selected intervals, and as previously stated, a plurality of electrical conductors or leads 25—27 may extend along the length of the cable 6 through small passageways 19 or the like, for transmitting power and information signals along the length of the cable 6. As further illustrated, the cable 6 may include a plurality (only one depicted) of depth sensors 28 for providing continuous information as to the actual depth of the cable 6 during its operation and use.

In a preferred embodiment of the present invention, the cable 6 may be stoppered at both ends (only one end depicted) by a partially hollow filling stopper 22, having a central passageway 19 opening only into the interior 21 of the sheath 20, and having a lateral fill passage closeable by a removable threaded fill plug 24. The filling stopper 22 may be further provided with a nose portion 23 for receiving the end of the sheath 20, which is slidably but snugly fitted onto the nose portion 23 of the stopper 22 and secured thereto by any suitable means or technique.

If it is assumed that the end of the cable 6 depicted in FIG. 2 is the dangling or free end, the kerosene is conducted into the fill passage (depicted as closed by plug 24) and through the passageway 19 in the filling stopper 22 into the interior 21 of the sheath 20. In a typical cable 6 such as that depicted in FIG. 2, the sheath 20 may be a flexible seamless vinyl tubing having an inside diameter of 2½ inches, and having a more or less transparent or clear wall one-eighth inch thick. As illustrated in FIG. 2, however, the interior region 21 of the sheath 20 is effectively divided into a series of compartments by the components positioned therein. Furthermore, liquid flow between these compartment is difficult due to the necessity of flowing through the narrow or restricted apertures 19 in the anchors 29, and through other restricted passages around or through other components such as the geophones 30 and the like. Nevertheless, it is necessary as hereinbefore explained to substantially completely fill the cable 6 with kerosene, or the like, in order to avoid trapping any appreciable amount of air in any of these compartments.

Referring now to FIG. 3, there may be seen a more detailed pictorial representation, partly in cross section, of the filling stopper 22 depicted more generally in FIG. 2. In particular, the filling stopper 22 may be seen to have a nose portion 23 slidably inserted in the open end of the sheath 20 and having a central passageway 19 as hereinbefore stated. The stopper 22 may be fastened in the end of the sheath 20 by any suitable means. For example, an anchor 29 having a plurality of narrow passages 19 (restricting fluid flow thereacross) for supporting conductors such as leads 25—27 may be secured fixedly within the sheath 20. A suitable bolt 37, fastened in the anchor 29, may extend through the passageway 19 and through the closed end of the filling stopper 22, and a suitable nut 38 may be used to hold the stopper 22 in the end of the sheath 20.

The stopper 22 may further include a hollow insert 31 embedded in the wall of the stopper 22 and secured therein by means of an annular groove 32. As illustrated, the insert 31 contains internal threads 33 for accommodating the plug 24, but is further provided at its inner end with an internal shutoff surface 34 and a centrally located port 35. As further illustrated, the lower end 24A of the plug 24 is fashioned to sealingly engage the surface 34 when the plug 24 is inserted into the insert 31, since the threads 33 will not provide a pressuretight seal between the inside surface 36 of the stopper 22 and its outside surface.

Figure 4:
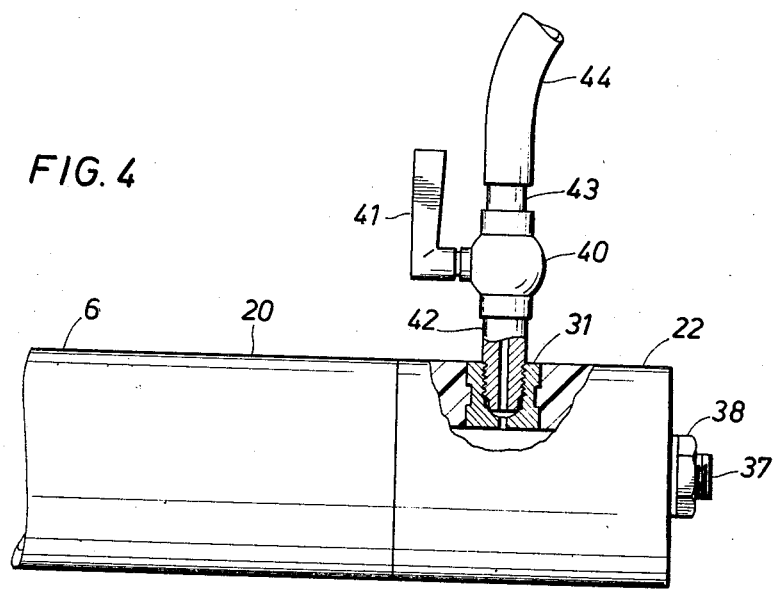
FIG. 4 is a pictorial representation, partly in cross section, of a suitable stop cock or other valve arranged to connect the interior of a marine seismic cable with either a vacuum pump or a supply of liquid.

Referring now to FIG. 4, there may be seen a simplified exterior view of the portion of the cable 6 including the filling (or evacuation) stopper 22 inserted and locked in the end of the sheath 20 by means of the bolt 37 and nut 38 hereinbefore described. In FIG. 4, however, the plug 24 has been replaced by a stop cock 40 or other suitable means, having a shutoff handle 41, and having a nipple end 42 threaded to fit into insert 31. More particularly, the nipple end 42 may be seen to be provided with a shutoff surface at its end for engaging the inside shutoff surface of the insert 31 in a fluid or pressuretight manner. A hose 44 may be removably attached to the hose end 43 of the stop cock 40 for providing the kerosene, or for evacuation of air, as will hereinafter be explained.

Figure 5:
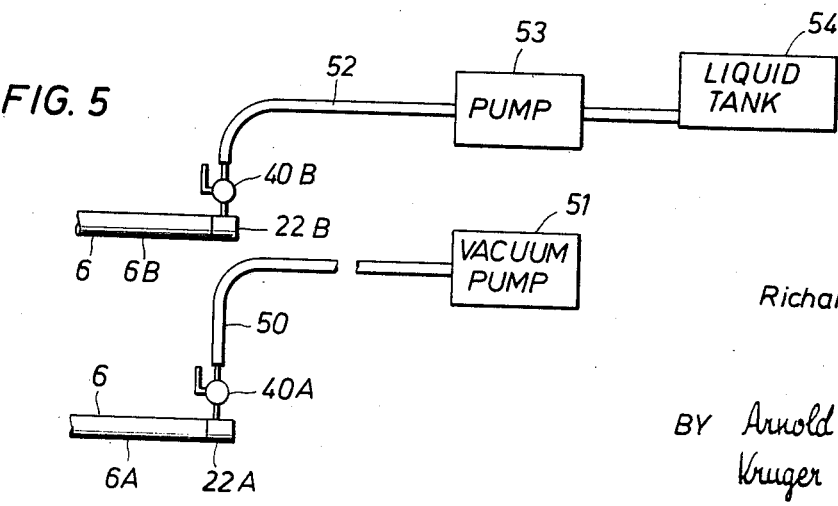
FIG. 5 is a functional representation of the overall configuration of a system for evacuating and refilling a marine seismic cable with a liquid such as kerosene.

Referring now to FIG. 5, there may be seen a simplified functional arrangement of apparatus for filling a marine seismic cable of the type depicted in FIG. 1 with kerosene while it is wound on a spool 4. As depicted, the "dangling" or free end 6B of the cable 6 preferably contains a filling stopper 22B wherein the stop cock 40B has been connected to a flexible conduit or hose 52 leading to a suitable pump 53 which, in turn, is connected to a supply 54 of a suitable liquid such as kerosene. The opposite end 6B of the cable 6, however, which is fitted with a similar stopper 22A, is connected to a suitable vacuum pump 51 by means of another conduit or hose 50 and the stop cock 40A mounted on the stopper 22A.

As hereinbefore stated, the dangling end 6B of the cable 6 is elevated above the opposite end 6A. Accordingly, the stop cock 40A may be opened and the vacuum pump 51 may be energized to begin evacuation of air from within the cable 6. Concurrently therewith, or immediately thereafter, the other stop cock 40B may be opened and kerosene may be progressively injected into the other end 20B of the cable 6 during evacuation through the stopper 22A and stop cock 40A. After cable 6 has been filled in this manner, the stop cocks 40A and B may be removed from the stoppers 22A and B, respectively, and may be replaced by plugs such as the plug 24 depicted in FIG. 3, to prevent the kerosene from leaking out of the sheath 20.

Referring now to FIG. 6, there may be seen a simplified pictorial representation of a conventional spool 104 or the like, with a marine seismic cable 106 of conventional design and length wound thereon. As may further be seen, the dangling or free end 106A of the cable 106 may be provided with a filling stopper 122 of the type depicted in FIG. 3, and having a nipple 142 and stop cock 140 whereby the interior of the cable 106 may be evacuated and thereafter filled with liquid as hereinbefore described. The opposite end 100 of the cable 106 is preferably made accessible by having it disposed conveniently through a small aperture 105 in one of the two flanges 107 and 109 of the spool 104. Accordingly, this end 100 may be provided with a similar stopper 124 having a stop cock 125 connected thereto by a nipple 123. The stop cock 140 is connected to a kerosene pump (not depicted) by a suitable hose 141, and the stop cock 125 is connected to a vacuum pump (not depicted) by a similar hose 126. As previously stated, the dangling end 106A of the cable 106 is preferably elevated above the other end 100 during the filling process.

Because of the difficulty of properly filling a marine seismic cable 106 by conventional techniques, the cable 106 has heretofore usually been filled at the factory. However, this has required that the assembled cable 106 be transported to its destination while filled with liquid, and this has greatly increased its shipping weight and handling difficulty.

If the cable 106 is delivered on board the vessel while wound on a spool 104 in the manner depicted in FIG. 6, the cable 106 may now be easily and quickly filled with any suitable liquid while mounted on the spool 104, and this eliminates the necessity for removing it from the spool 104 and stretching it out on the deck of the vessel as hereinbefore described. Accordingly, the cable 106 may now be transported to the vessel and stored thereon while empty, since it need not now be filled with liquid until just before it is to be used.

It will further be apparent from the foregoing that various modifications and variations may be made in the structures and procedures described herein without substantial departure from the essential concepts of the present invention. Accordingly, it should be clearly understood that the forms of the invention described herein and depicted in the accompanying drawings, are exemplary only and are not intended as limitations on the scope of the present invention.

What I claim is:

1. A method for filling the interior of an elongated, flexible tubular sheath containing seismic transducers and wiring where the sheath is spooled on a reel and has open accessible ends comprising the steps of closing off one end of said sheath, evacuating ambient air from the interior of the sheath by applying a vacuum to the other end of said sheath to reduce the pressure within the sheath below atmospheric pressure, at the reduced pressure, and while evacuating the air from the sheath, introducing a filling liquid to said one end and continuing the flow of filling liquid until the sheath is completely filled, and sealing off the ends of said sheath.

2. The method of claim 1 wherein the method includes elevating the other end above said one end while introducing said filling liquid.

3. The method of claim 2 wherein said sheath is wound on a reel before closing off the one end of said sheath.